June 5, 1951        J. P. KOLB        2,555,413
TORQUE DISTRIBUTING DRIVE
Filed April 2, 1947        2 Sheets-Sheet 1
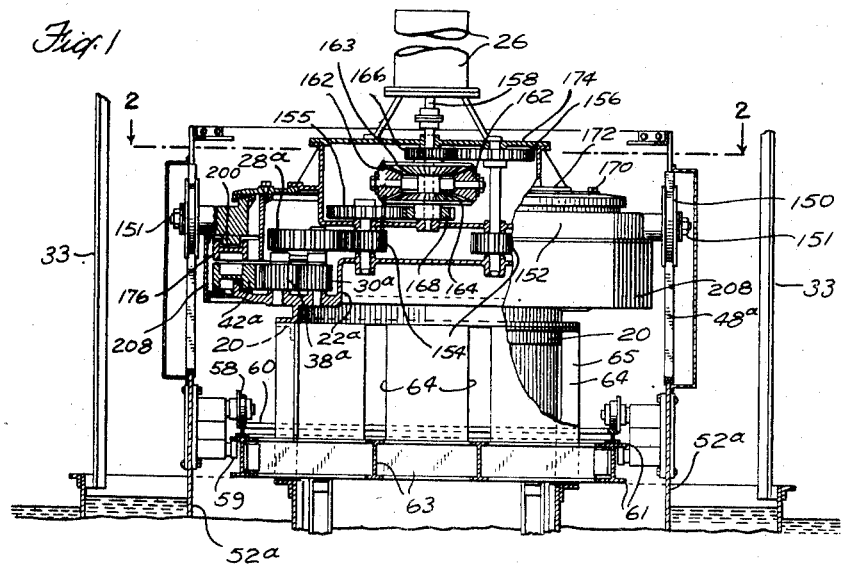
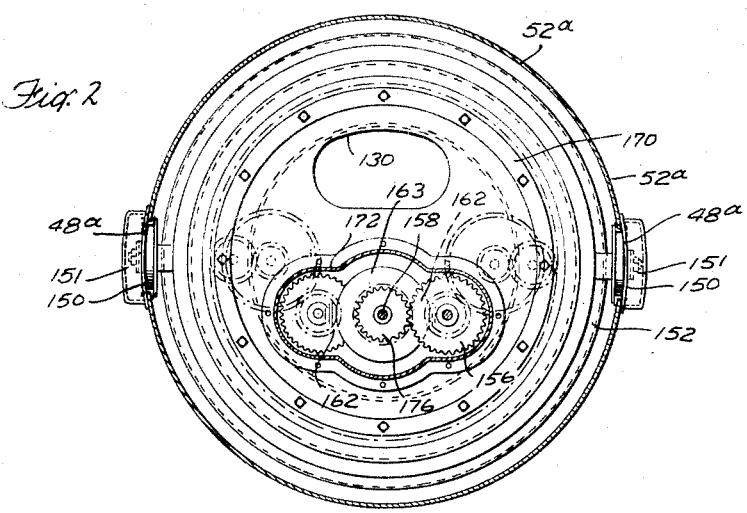
INVENTOR
John P. Kolb
ATTORNEY

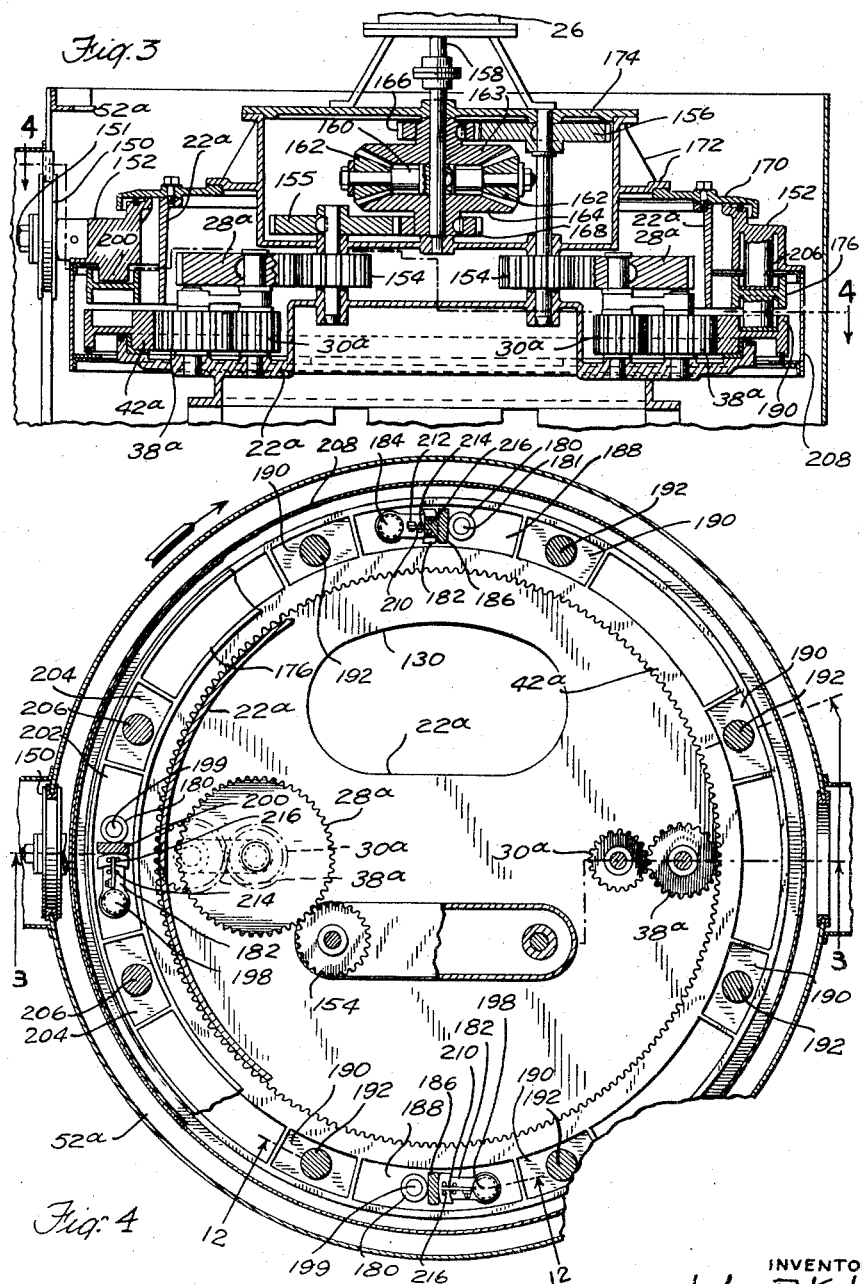

Patented June 5, 1951

2,555,413

UNITED STATES PATENT OFFICE 2,555,413

TORQUE DISTRIBUTING DRIVE

John P. Kolb, New York, N. Y., assignor to General American Transportation Corporation, Chicago, Ill., a corporation of New York Application April 2, 1947, Serial No. 739,009

1 Claim. (Cl. 74—705)

This invention relates to reduction gearing of the type employed to convert the relatively high speed of the driving shaft of an electric motor or other prime mover into the desired relatively slow rotation, with the accompanying mechanical advantages, of a part to be driven.

Reduction gearing of the type hereinafter more specifically described, in which the part to be driven at a relatively low speed of rotation comprises a large gear to which rotation is imparted by pinions constituting parts of the reduction gearing, requires, for an even or balanced application of torque to the large gear, the application of the driving power thereto at points equiangularly spaced about its axis. In order to effect such a distribution of the driving torque, usually a plurality of trains of reducing gears are interposed between the driving shaft and the large gear to be driven.

Where, as in the embodiment of the invention herein illustrated, the ultimate driven gear of the reduction gearing is itself employed to transmit rotary movement to parts which, at times, offer unequally distributed torque resistance, so that the torque reaction upon the utimate driven gear is unevenly applied at different points about its axis, it is particularly important that the application of driving torque to this gear be uniformly distributed about its axis.

A general object of the present invention, therefore, is to insure, as nearly as possible, uniform distribution of the driving torque about the axis of the ultimate gear to be driven in the reduction gearing, particularly where the driving torque is transmitted to the ultimate gear through a plurality of trains of reduction gears.

More particularly the invention aims so to connect differential gearing to a plurality of trains of reducing gears, interposed between a driving shaft and the single ultimate gear to be driven, as to insure equal distribution of the driving torque or driving load through the trains of reducing gears to the points of drive of the ultimate gear to be driven.

An important feature of the invention is the mounting of the differential gearing, through which equalization of the load between the gear trains is effected, upon the driving shaft of the prime mover, whereby the same amount of driving torque is imparted to the first gear of each of the trains of reducing gears.

Other objects, important features and advantages of the invention, to which reference has not hereinabove specifically been directed, will appear hereinafter when the following description and claim are considered in connection with the accompanying drawings, in which—

Figure 1 is a vertical elevation partly broken away and partly in section of the driving mechanism of sedimentation apparatus which embodies the improved reduction gearing of the present invention;

Figure 2 is a view partly in section and partly in plan taken on the line 2—2 of Figure 1;

Figure 3 is a view in enlarged axial section of the drive mechanism shown centrally in Figure 1, and Figure 4 is a cross sectional view taken on the line 4—4 of Figure 3.

As above suggested, the invention is herein shown as embodied in mechanism for driving the sheet metal drum 52a on which are mounted the scraper or rack carrying arms of sedimentation apparatus, such as that more fully shown and described in the co-pending application of Roman Chelminski et al., Serial No. 588,278, filed April 14, 1945. In the sedimentation apparatus shown in said co-pending application, the motor 26 and the trains of reducing gears, through which rotary motion is transmitted from the driving shaft 158 of the motor to the ring gear 42a and, through the ring gear 42a, to the rollers 150 which engage tracks 48a in vertical slots in the drum 52a, are all carried upon a pier 14 located at the center of the sedimentation tank. Through suitably controlled hydraulic apparatus, not herein specifically shown and described but fully disclosed in said co-pending application, a vertically movable frame, carrying a track 60 on which rollers 58 supporting the drum 52a are mounted and beneath the flange 61 of which other rollers 59, also connected to the drum 52a, have their bearings, may be vertically raised and lowered to lift and again lower the rake or scraper carrying arms hereinabove referred to. Horizontal I-beams 63 of the aforementioned frame extend through slots 64 in pier 14 and support the aforementioned tracks 60 and flange 61. A slot 64 in the pier 14 and the vertical slots in the drum 52a in which the rollers 150 are located permit the relative vertical movement of the drum carrying frame and the driving mechanism.

The driving connections between the ring gear 42a and the rollers 150, running on the vertical tracks 48a in the vertical slots in the drum 52a, preferably include a flexible drive coupling comprising an upper ring 152, on which are stud shafts 151 for the anti-friction rollers 150, and an intermediate coupling ring 176, so connected to the ring gear 42a, on the one hand, that it may have slight relative movement thereto along one diameter of said coupling ring 176 and so connected to the upper ring 152 on the other hand, that it may have slight relative movement to said ring 152 along a diameter of the ring 176 at right angles to the first-mentioned diameter. This permits a flexible drive between the ring gear 42a and the ring 150 approximating that provided by an Oldham coupling. This novel flexible drive coupling is not an essential part of the present invention but is the subject-matter of my co-pending application Serial No. 739,010 filed April 2, 1947, to which reference may be had for a more detailed description of the driving connections between the rings which make up the coupling.

From the description so far it will be seen that, when the reduction gearing transmission of the present invention is employed to transmit driving power from the motor 26 to the ring gear 42a and then, through the flexible drive coupling above referred to, to the drum 52a on which the rack or scraper carrying arms of concentrating apparatus such as shown and described in my co-pending application are mounted, if these arms encounter overloads due to irregularities in the composition of the influent, surges and other conditions tending to irregular settling, the torque reaction on the drum 52a will not necessarily be evenly distributed about the axis of the drum and thus the importance of insuring equal distribution of the load through the two trains of reduction gears herein shown will become evident.

As above suggested, the provision of means to insure a substantially equal division of the load between the gear trains is the general object of the present invention.

As herein shown, two like gear trains have their bearings in a stationary body or housing 22. These trains of reducing gears comprise pinions 38a engaging the internal teeth on the large annular gear 42a. The pinions 38a are in turn driven from pinions 30a attached to gears 28a which mesh with pinions 154. The pinion 154 of one train of reducing gears is keyed to a shaft to which is also keyed a gear 155 in the lower part of the differential housing 165. The gear 154 of the other train is keyed to a shaft which has a bearing also in the upper part of the differential housing and to which, near its upper end, is keyed a gear 156.

As herein shown, the motor shaft 158 is positively coupled to a shaft 161 having its bearings in the differential housing 165. The differential mechanism through which the two trains of reducing gears are driven from the motor shaft 158 comprises a central spider 160 keyed on the shaft 161 and having rotatably secured thereon a plurality of bevel pinions 162 intermeshing with upper and lower bevel gears 163 and 164, the latter being rotatable on the shaft 161. A drive gear 166 is connected to the upper bevel gear 163 and this gear 166 in turn meshes with an intermediate gear 156 constituting the initial gear of the reduction gear train on the right hand side of Figure 3. The lower bevel gear 164 of the differential is keyed directly to a drive gear 168 which, in a similar manner, drive the intermediate gear 155 of the left hand gear train and through it the said left hand reducing gear train.

From the foregoing description it will be seen that the interposition of the differential, comprising the bevel pinions 162 on the spider arms and the bevel gears 163 and 164 intermeshing with said pinions 162, between the driving shaft 158 and the initial driving pinions 166 and 168 of the respective reducing gear trains insures that any torque reaction from the ring gear 42a upon the pinions 38a directly engaged therewith will be equally distributed between the right hand and left hand reducing gear trains and thus there will be a substantially equal division of the load between the two gear trains 154—28a—30a—38a.

Although the invention is herein shown as embodied in a reduction gear comprising only two trains of reducing gears, it will be understood that the invention is not limited to securing equal division of the load between merely two trains of reducing gears, even though, for most practical purposes, two trains, applying the driving torque at diametrically opposite points on the ring gear, are usually sufficient.

What is claimed as new is:

In reduction gearing for the purposes set forth, in combination, a final gear for transmitting driving torque to a load, a drive shaft, a differential gear assembly mounted on said drive shaft and including a pair of driven gears adapted to be rotated upon rotation of said drive shaft, a first train of reduction gears interconnecting one of said driven gears and said final gear and a second and independent train of reduction gears connecting the other of said driven gears and a point on said final gear diametrically opposite the point of connection of said first train and final gear, the sole connections between said first and second gear trains being through said differential assembly and through said final gear, a first housing enclosing said gear trains and final gear, a second housing mounted on said first housing and enclosing said differential gear assembly and a motor mounted on said second housing and connected to drive said drive shaft.

JOHN P. KOLB.

REFERENCES CITED

The following references are of record in the file of this patent:

UNITED STATES PATENTS

| Number | Name | Date |
|---|---|---|
| 346,674 | Newell | Aug. 3, 1886 |
| 1,522,469 | Schenk | Jan. 6, 1925 |
| 1,777,860 | Sandherr | Oct. 7, 1930 |
| 1,825,957 | Johnson | Oct. 6, 1931 |
| 1,977,553 | Halford | Oct. 16, 1934 |

FOREIGN PATENTS

| Number | Country | Date |
|---|---|---|
| 349,989 | Germany | Mar. 11, 1922 |